United States Patent
Takayama

(10) Patent No.: US 9,335,557 B2
(45) Date of Patent: May 10, 2016

(54) DIFFRACTIVE OPTICAL ELEMENT HAVING HIGH DIFFRACTION EFFICIENCY AT PLURAL WAVELENGTHS AND IMAGE-PICKUP OPTICAL SYSTEM USING THE SAME

(75) Inventor: Hidemi Takayama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 778 days.

(21) Appl. No.: 13/213,169

(22) Filed: Aug. 19, 2011

(65) Prior Publication Data
US 2012/0050868 A1    Mar. 1, 2012

(30) Foreign Application Priority Data
Aug. 30, 2010   (JP) ................ 2010-191656

(51) Int. Cl.
G02B 5/18    (2006.01)
G02B 13/02   (2006.01)
G02B 27/42   (2006.01)
G02B 27/00   (2006.01)

(52) U.S. Cl.
CPC .......... *G02B 27/4288* (2013.01); *G02B 5/1842* (2013.01); *G02B 5/1871* (2013.01); *G02B 13/02* (2013.01); *G02B 27/0037* (2013.01); *G02B 27/4211* (2013.01)

(58) Field of Classification Search
CPC .. G02B 3/08; G02B 27/0025; G02B 27/0062; G02B 5/1842; G02B 5/1871; G02B 13/02; G02B 27/0037; G02B 27/4211; G02B 27/4288
USPC ......... 359/558, 566, 569, 570, 571, 574, 575, 359/576, 742, 743; 369/112.03–112.14; 349/193, 201–202
See application file for complete search history.

(56) References Cited

U.S. PATENT DOCUMENTS

| | | | |
|---|---|---|---|
| 2005/0117221 A1* | 6/2005 | Ogawa | 359/565 |
| 2008/0174871 A1* | 7/2008 | Ukuda et al. | 359/576 |
| 2009/0128912 A1* | 5/2009 | Okada et al. | 359/576 |
| 2009/0168205 A1* | 7/2009 | Inoue | 359/796 |

(Continued)

FOREIGN PATENT DOCUMENTS

| | | |
|---|---|---|
| JP | 2000-302463 A | 10/2000 |
| JP | 2002-062416 A | 2/2002 |

(Continued)

OTHER PUBLICATIONS

Japanese Office Action for corresponding JP 2010-191656, mail date May 27, 2014.

*Primary Examiner* — Kimberly N Kakalec
(74) *Attorney, Agent, or Firm* — Rossi, Kimms & McDowell LLP

(57) ABSTRACT

A diffractive optical element in which the maximum optical path length of light is an integral multiple of each of a plurality of wavelengths includes a diffractive grating configured by combining a first member and a second member having a refractive index lower than a refractive index of the first member and having dispersion higher than a dispersion of the first member. At least one of the first member and the second member is made of a glass material, and the diffractive grating is formed by the glass material which is heated to be softened using a thermal press forming, and has a concave grating shape that has a grating height increasing from a central part toward a peripheral part.

6 Claims, 7 Drawing Sheets

(56) References Cited

U.S. PATENT DOCUMENTS

| | | | |
|---|---|---|---|
| 2009/0231712 A1* | 9/2009 | Ushigome | 359/569 |
| 2009/0323502 A1* | 12/2009 | Murata et al. | 369/112.03 |
| 2010/0110548 A1* | 5/2010 | Korenaga et al. | 359/571 |
| 2010/0134889 A1* | 6/2010 | Takayama | G02B 5/1866 359/576 |
| 2010/0246008 A1* | 9/2010 | Murata et al. | 359/576 |

FOREIGN PATENT DOCUMENTS

| | | | |
|---|---|---|---|
| JP | 2004-157404 A | | 6/2004 |
| JP | 2008-242186 A | | 10/2008 |
| JP | 2008-242390 A | | 10/2008 |
| WO | WO 2010032347 A1 | * | 3/2010 |

* cited by examiner

DIFFRACTIVE OPTICAL ELEMENT HAVING HIGH DIFFRACTION EFFICIENCY AT PLURAL WAVELENGTHS AND IMAGE-PICKUP OPTICAL SYSTEM USING THE SAME

BACKGROUND OF THE INVENTION

1. Field of the Invention

The present invention relates to a diffractive optical element having high diffraction efficiency at a plurality of wavelengths and an image-pickup optical system using the diffractive optical element.

2. Description of the Related Art

Previously, as a method of reducing a chromatic aberration of an optical system, a method of providing a diffractive optical element having a diffractive action as a part of an image-pickup optical system has been known. It is preferred that the diffractive optical element be manufactured by a thermal press forming of a glass in view of cost, but there is a problem that an end of a grating is cracked when forming the grating of the diffractive optical element. Therefore, practically, it is limited to a single-layer diffractive optical element that has a low grating.

A contact-type diffractive optical element can maintain high diffraction efficiency over a wide wavelength range, but a grating height of the diffractive grating has a height from a few micrometers to a few dozens of micrometers. Therefore, in order to form the grating of the glass, a method of easily separating the glass from the mold or a countermeasure of the grating crack is needed. Japanese Patent Laid-Open No. 2000-302463 discloses a method of manufacturing a diffractive optical element using the thermal press forming of a glass in which a peripheral part that has no grating is provided with a step and also the step is tapered to provoke the separation of the glass and a mold. Japanese Patent Laid-Open No. 2002-62416 discloses a configuration that prevents a glass from entering the deepest part of a grating portion of a mold to ensure the separation of the glass and the mold. Japanese Patent Laid-Open No. 2004-157404 discloses a diffractive optical element that has a grating whose end is round to prevent a grating crack.

However, in the method of Japanese Patent Laid-Open No. 2000-302463, the phenomenon that the end of the grating is hooked on the mold cannot be prevented although the separation is provoked in the peripheral part. In the configurations of Japanese Patent Laid-Open No. 2002-62416 and Japanese Patent Laid-Open No. 2004-157404, the shape of the grating end of the diffractive grating is cracked, and it is difficult to maintain high diffraction efficiency in a wide wavelength range. Thus, in the conventional diffractive optical element, the generation of unnecessary light cannot be suppressed.

SUMMARY OF THE INVENTION

The present invention provides a high-performance diffractive optical element at low cost.

A diffractive optical element as one aspect of the present invention is a diffractive optical element in which the maximum optical path length of light is an integral multiple of each of a plurality of wavelengths. The diffractive optical element includes a diffractive grating configured by combining a first member and a second member having a refractive index lower than a refractive index of the first member and having dispersion higher than a dispersion of the first member. At least one of the first member and the second member is made of a glass material. The diffractive grating is formed by the glass material which is heated to be softened using a thermal press forming, and has a concave grating shape that has a grating height increasing from a central part toward a peripheral part.

An image-pickup optical system as another aspect of the present invention includes the diffractive optical element, a stop, and an image pickup element.

Further features and aspects of the present invention will become apparent from the following description of exemplary embodiments with reference to the attached drawings.

DESCRIPTION OF THE PREFERRED EMBODIMENTS

Figure 1:
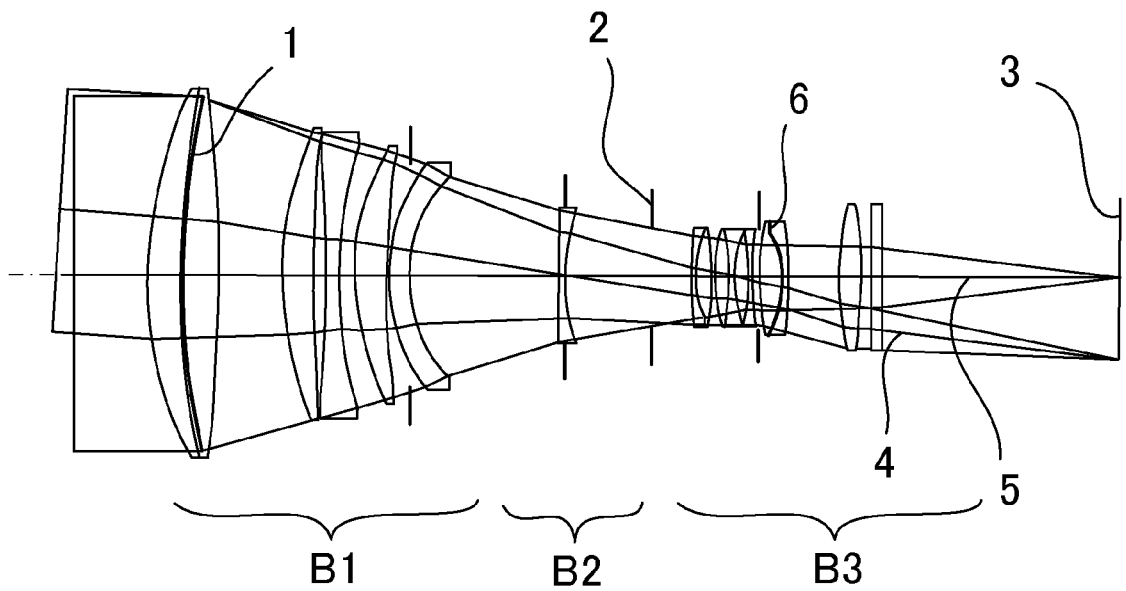
FIG. 1 is a schematic configuration diagram of an image-pickup optical system in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, Embodiment 1 of the present invention will be described. FIG. 1 is a schematic configuration diagram of an image-pickup optical system in the present embodiment. Specifically, it illustrates a telephoto lens of 400 mm. In FIG. 1, reference numeral 1 denotes a diffractive optical element, reference numeral 2 denotes a stop, reference numeral 3 denotes an image surface of an image pickup element such as a CCD, reference numeral 4 denotes light beam having the maximum angle of field, reference numeral 5 denotes an optical axis of the image-pickup optical system, and reference numeral 6 denotes a diffractive optical element (a second diffractive optical element).

When a first unit lens has a positive power as is the case for the telephoto lens of 400 mm, the arrangement of the diffractive optical element at an object point side is effective to correct a chromatic aberration of magnification. Therefore, it is preferred that the diffractive optical element be disposed at the object point side as much as possible. The image-pickup optical system of the present embodiment is configured by a first unit lens B1 having a positive refractive power, a second unit lens B2 having a negative refractive power, and a third unit lens B3 having a positive refractive power. In this case, using the diffractive optical element as the first unit lens B1 is most effective to correct the chromatic aberration of magnification. In the diffractive optical element of the present embodiment, a diffractive grating is configured so that a grating pitch becomes narrower from a central part toward a peripheral part since it applies a phase having a positive power. Using the diffractive grating can improve the chromatic aberration as the image-pickup optical system.

In order to correct an axial chromatic aberration, it is more preferred that one more diffractive optical element be added to the image-pickup optical system illustrated in FIG. 1. In this case, it is preferred that the added diffractive optical element be disposed near the stop 2. Generally, when a plurality of diffractive optical elements are used, the effects of increasing the degree of freedom for the design and improving the optical performance are also expected.

Figure 2:
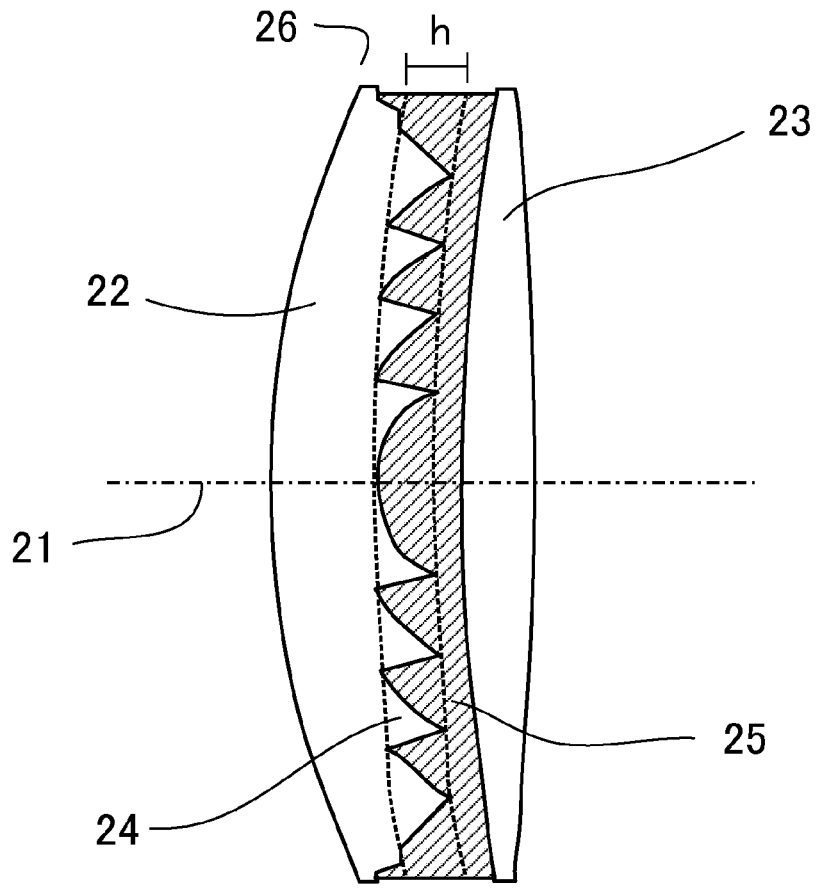
FIG. 2 is a cross-sectional diagram of a diffractive optical element in Embodiment 1.

FIG. 2 is a cross-sectional diagram of a diffractive optical element 26 in the present embodiment. In FIG. 2, reference numeral 21 denotes an optical axis. Reference numeral 22 denotes a first lens (a second member), and the first lens 22 includes a diffractive grating portion 24. The first lens 22 is made of a glass material having a low melting point, and K-PG395 (SUMITA OPTICAL GLASS, Inc.) is used as the glass material in the present embodiment. Reference numeral 23 denotes a second lens, and reference numeral 25 denotes a resin material (a first member) having a high refractive index and a low dispersion. In the present embodiment, it is preferred that the resin material 25 be a material in which organic or inorganic nanoparticle materials having a refractive index higher than the resin material 25 are dispersed in abase material made of a resin. Specifically, for example an ultraviolet curable resin C001 (DIC Corporation) is used as the base material, and nanoparticles of Zirconium oxide ($ZrO_2$) of 36 vol % are dispersed in the base material. Thus, the diffractive grating in the diffractive optical element 26 is configured by combining the resin material 25 with the first lens 22 having a refractive index lower than and dispersion higher than the resin material 25. The diffractive optical element 26 is configured so that the maximum optical path lengths of lights at a plurality of wavelengths are integral multiples of the wavelengths.

Figure 5:
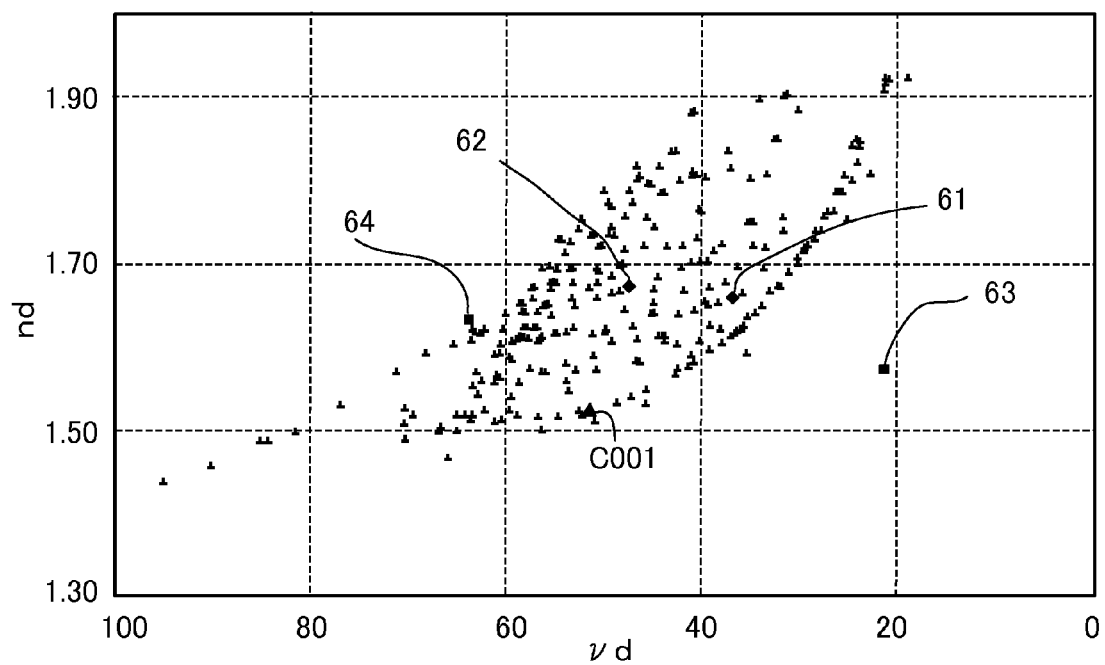
FIG. 5 is a diagram of a relationship between a refractive index and Abbe number of each material that is used in the present embodiment.

FIG. 5 is a diagram of a relationship between refractive indexes nd and dispersions (Abbe numbers vd) of the first lens 22 and the resin material 25. In FIG. 5, the first lens 22 is indicated as a point 61, and the resin material 25 having the high refractive index and the low dispersion material is indicated as a point 62. Thus, the combination of a material having a low refractive index and high dispersion and a material having a high refractive index and low dispersion can obtain high diffraction efficiency in a wide wavelength range.

Subsequently, a method of manufacturing the diffractive optical element 26 will be described. First of all, a glass material having a low melting point is heated and softened, and this glass material is supplied into a mold that includes an upper mold and a lower mold. One of the upper mold and the lower mold has a curved surface shape at its one side, and a diffractive grating is formed on a surface of the other mold.

Next, using the upper mold and the lower mold, a predetermined pressure is applied to the softened glass material, and molding is performed so that this glass material has a shape corresponding to the shape of the mold. Then, the glass material is cooled until the temperature of the glass material is lower than or equal to a transition point to harden the glass material, and the glass material is separated from the mold to be picked up. Next, the resin material 25 (an ultraviolet curable resin) is applied to a surface of the diffractive grating portion 24 in the molded glass material, and the resin material 25 firmly contacts the second lens 23 to perform an ultraviolet radiation. According to the above process, the contact-type diffractive optical element 26 in which the diffractive grating is formed at an interface between the glass material (the first lens 22) and the resin material 25 can be manufactured.

The above description is the method of forming the diffractive grating (the diffractive optical element) between the first lens 22 and the second lens 23, but the present embodiment is not limited to this. When the diffractive optical element is formed on a surface of a lens, the resin material is applied to the diffractive grating after the thermal press forming of the glass material is performed, and the mold used for forming the resin material firmly contacts the resin material to perform ultraviolet curing. Then, this mold is separated from the resin material to be able to manufacture the contact-type diffractive optical element in which the diffractive grating is formed at the interface between the glass material and the resin material on the surface of the glass material.

Figure 3A:
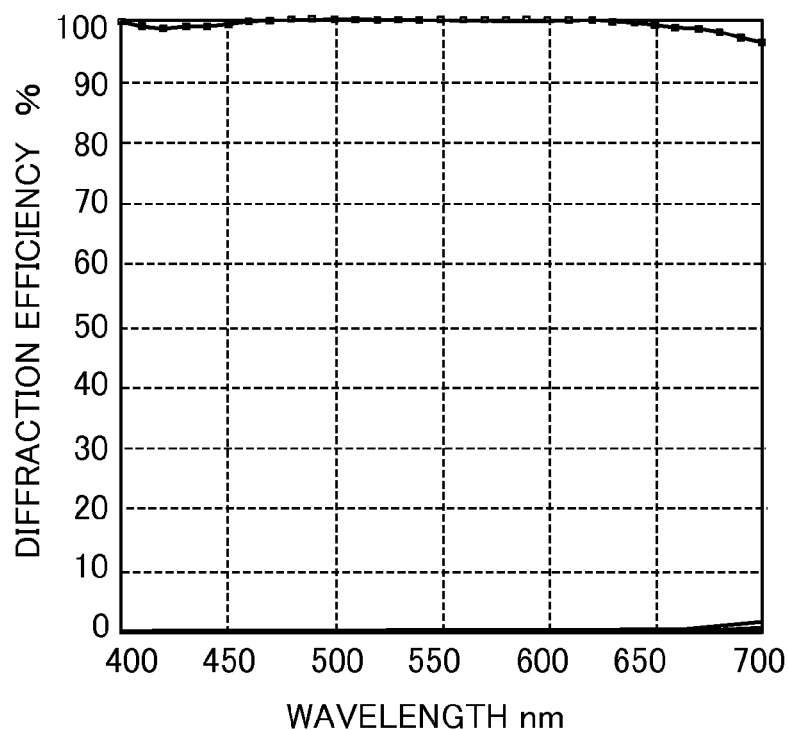
FIG. 3A is a graph illustrating a diffraction efficiency of the diffractive optical element for first-order light in Embodiment 1.
Figure 3B:
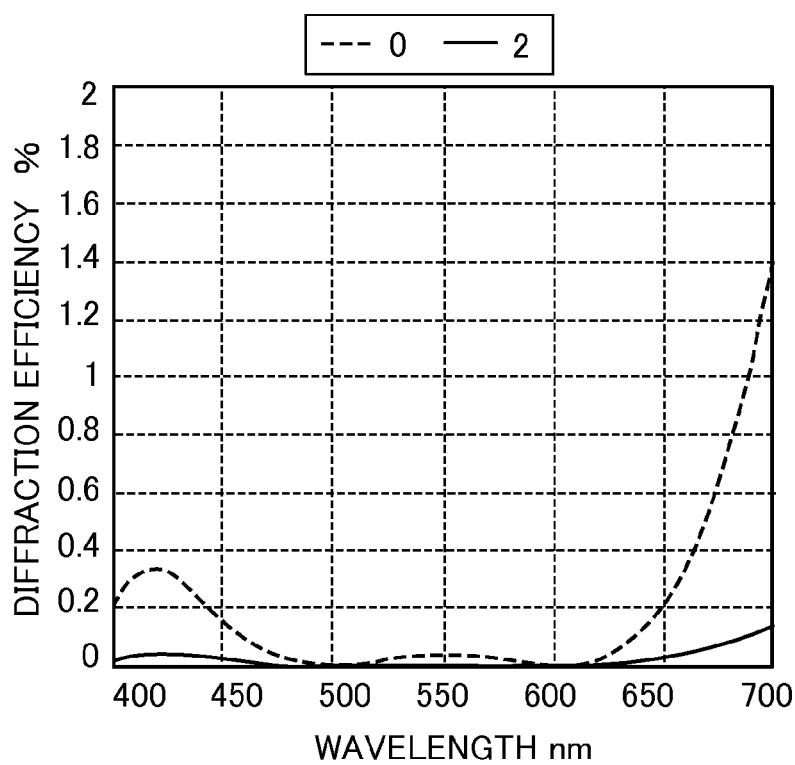
FIG. 3B is a graph illustrating a diffraction efficiency of the diffractive optical element for zeroth-order light and second-order light in Embodiment 1.

FIG. 3A is a graph illustrating diffraction efficiency (first-order light) of the diffractive optical element in the present embodiment. In the diffractive grating (the diffractive optical element 26) that is configured by combining the first lens 22 (the glass material) with the resin material 25, when a grating height is 39 μm, high diffraction efficiency over a visible and wide wavelength range as illustrated in FIG. 3A can be achieved. FIG. 3B is a graph illustrating diffraction efficiencies for zeroth-order light and second-order light that are unnecessary diffracted light. As illustrated in FIG. 3B, in a visible wavelength range, the diffraction efficiencies for both the zeroth-order light and the second-order light indicate low values, and thus the deterioration of images caused by the unnecessary light can be suppressed.

Figure 4:
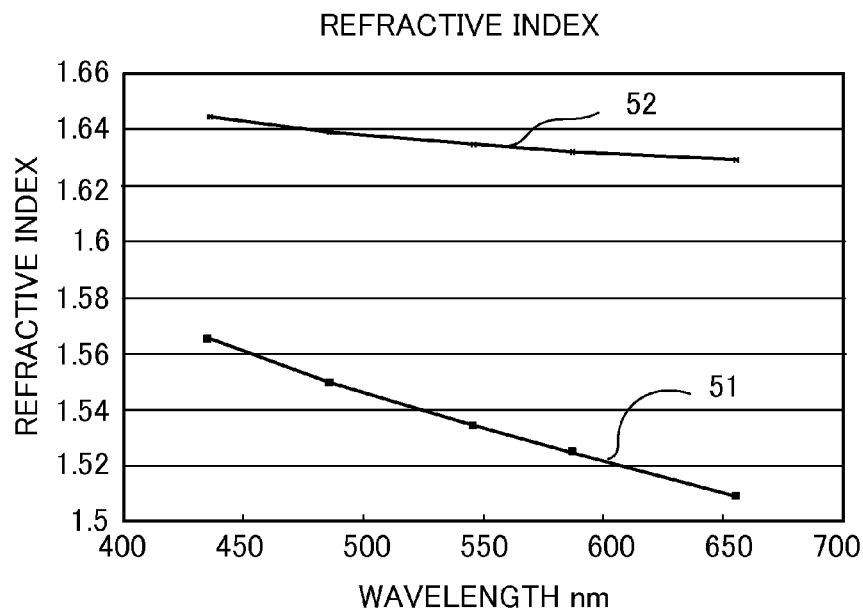
FIG. 4 is wavelength properties of a refractive index of the diffractive optical element in Embodiment 1.

FIG. 4 is wavelength properties of the refractive indexes of the first lens 22 (the glass material) and the resin material 25. Reference numeral 51 denotes a refractive index of K-PG395 (the glass material) described above, and reference numeral 52 denotes a refractive index of the resin material. As illustrated in FIG. 4, as the wavelength gets longer, the interval of the refractive indexes 51 and 52 (two lines) of the two materials gets wider. According to the relationship, high diffraction efficiency can be maintained over a wide wavelength.

Figure 6A:
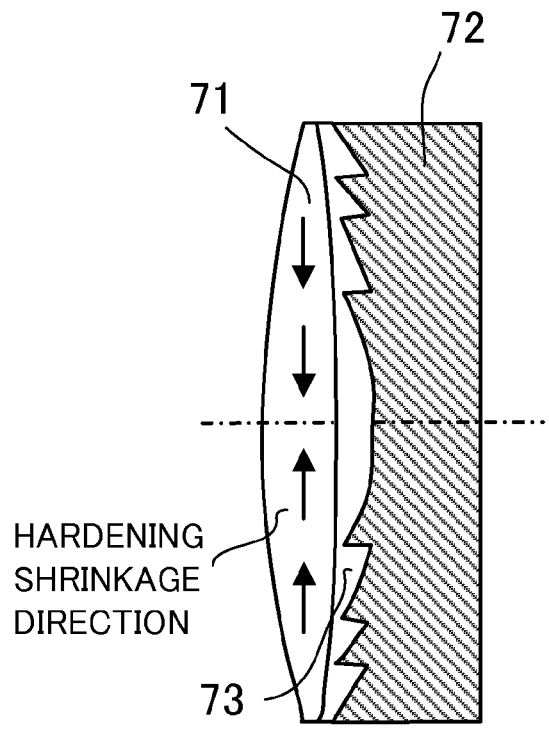
FIG. 6A is a diagram illustrating a state of a glass material and a mold during a thermal press forming of the glass material when Embodiment 1 is not applied.

FIG. 6A is, as a comparative example, a diagram of describing a separated state of the glass material and the mold when the present embodiment is not applied. In FIG. 6A, reference numeral 71 denotes a glass material having a low melting point, reference numeral 72 denotes a mold used for the molding that has a heat resistance, and reference numeral 73 denotes a diffractive grating portion of the glass material 71. In the thermal press forming of the glass material 71, first of all, the glass material is melted at a temperature greater than or equal to a melting point of glass material. The temperature of the melting point in this case (a glass transition temperature) is for example a temperature of 300 to 500 degrees C. in a glass material having a low melting point (a low-melting-point glass). Therefore, as the mold 72, a mold that has a heat resistance is necessary. Specifically, it is preferred that a mold in which a cemented carbide or silicon carbide is used as a base and a thin film such as a noble metal alloy of for example platinum or titanium nitride is formed on a forming surface or a film of diamond-like carbon be used. Furthermore, in order to withstand a high temperature, a mold and a thin film that is hard and that the linear expansion coefficient of around $5^{-6}$ is used.

On the other hand, the glass material 71 having the low melting point that is formed by using the mold 72 having the heat resistance has a linear expansion coefficient of around $10^{-6}$. Thus, the linear expansion coefficient of the mold 72 is smaller than the linear expansion coefficient of the glass material 71. Therefore, when the diffractive optical element is formed by the thermal press forming, it is difficult to separate the end of the diffractive grating portion in the diffractive optical element from the mold due to the difference of these linear expansion coefficients. FIG. 6A is a diagram of describing this state. When the glass material 71 melted at a high temperature is poured into the mold 72 and then the temperature of the mold 72 is lowered, the temperature of the glass material 71 is lowered. In accordance with the decrease of the temperature of the glass material 71, the glass material 71 shrinks to be hardened. In this case, since the temperature of the mold 72 is also lowered, the mold 72 similarly shrinks. As described above, however, the linear expansion coefficient of the glass material 71 is larger when the linear expansion coefficient of the mold 72 is compared with the linear expansion coefficient of the glass material 71. Therefore, an amount of shrinkage of the glass material 71 is relatively larger. An arrow in FIG. 6A indicates this relative shrinkage direction (a hardening shrinkage direction), and the glass material 71 shrinks in a direction of biting a wall surface of the diffractive grating portion 73. Thus, when the mold separation is performed in a state where the glass material 71 bites the mold 72, the grating may be cracked.

Figure 6B:
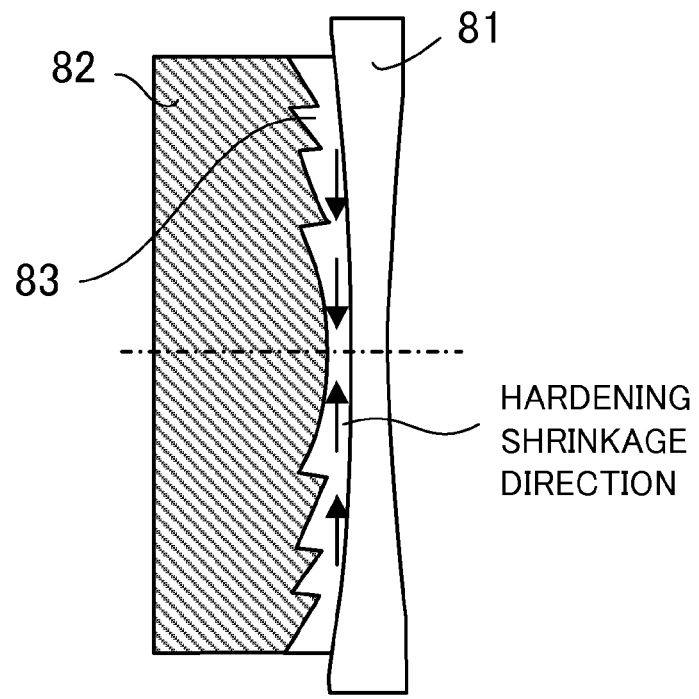
FIG. 6B is a diagram illustrating a state of a glass material and a mold during a thermal press forming of the glass material when Embodiment 1 is applied.

On the other hand, FIG. 6B is a diagram describing a separated state of the glass material and the mold when the present embodiment is applied. In FIG. 6B, reference numeral 81 denotes a glass material having a low melting point, reference numeral 82 denotes a mold that is used for forming the glass material 81, and reference numeral 83 denotes a diffractive grating portion in the glass material 81. In the present embodiment, the formed glass material 81 includes a diffractive grating portion 83 for applying a phase that has a concave grating shape having a grating height increasing from a central part toward a peripheral part. In this case, similarly to the above case, the mold 82 has a heat resistance and its linear expansion coefficient is smaller than the linear expansion coefficient of the formed glass material 81. Therefore, during the cooling process, an amount of shrinkage of the glass material 81 is larger than the mold 82, and the glass material 81 relatively shrinks in a direction of an arrow illustrated in FIG. 6B (a hardening shrinkage direction). Thus, in the diffractive grating portion 83 of the present embodiment, a grating wall surface of the mold 82 and a grating wall surface of the glass material 81 (the diffractive grating portion 83) move in directions away from each other. As a result, according to the diffractive optical element of the present embodiment, the separation of the mold is easily performed, and the end crack of the diffractive grating can be suppressed.

FIG. 5 is a diagram illustrating a combination of the glass material and the resin material in the present embodiment, and also indicating physical properties of commercial glass materials. In FIG. 5, reference numerals 61 and 62 indicate a point (a physical property) of the glass material of the first lens 22 and a point (a physical property) of the resin material 25, respectively. When a glass material having a low refractive index and high dispersion and corresponding to the thermal press (a low-melting-point glass) is selected, a refractive index of the glass material is higher than a refractive index of a common resin material. Therefore, in the present embodiment, a glass material having a refractive index as low as possible and dispersion as high as possible is selected. Furthermore, in order to improve the diffraction efficiency in a wide wavelength range, the combination of the Abbe number and the dispersion is a combination on a theoretically-specific line. A material used as the resin material is limited compared with the glass material. Therefore, in the present embodiment, in order to clear the difficulty of selecting the material, it is preferred that an organic or inorganic nanoparticle material be dispersed in the base material (the resin). Commonly, the molding of the organic material may be difficult, but the physical property can be adjusted by the nanoparticle dispersion while ensuring the shape of the organic material.

In the diffractive optical element of the present embodiment, when a refractive index and Abbe number of the glass material for the d-line wavelength are denoted by ngd and vgd respectively, and a refractive index and Abbe number of the resin material for the d-line wavelength are denoted by nrd and vrd respectively, it is preferred that each material be selected so that the following expressions are met.

$$ngd < nrd \tag{1}$$

$$vgd \leq 125 - 50ngd \tag{2}$$

$$ngd \leq 1.8 \tag{3}$$

$$vrd \geq 125 - 50nrd \tag{4}$$

$$nrd \geq 1.5 \tag{5}$$

Expressions (2) and (3) described above define ranges of the refractive index and the Abbe number of the glass material, and Expressions (4) and (5) described above define ranges of the refractive index and the Abbe number of the resin material. Meeting the ranges of the above Expressions (1) to (5), a material that shows high diffraction efficiency over a wide wavelength range can be easily selected. As illustrated in FIG. 5, an existing range of the commercial glass material is limited. In particular, at low Abbe number side, the boundary is clearly on the curved line. Therefore, in order to obtain high diffraction efficiency over a wide wavelength range, it is preferred that a material that has Abbe number as small as possible be selected. Particularly, the number of materials corresponding to the thermal press of the glass material is small. On the other hand, for the resin material, it is difficult to select a material that has a high refractive index, and it is difficult for a resin solely to select a material that has a large Abbe number and a high refractive index.

However, adopting the combination of the materials in the present embodiment, the diffractive grating of the diffractive optical element is formed by a thermal press forming of the glass material and the high diffraction efficiency can be maintained. Furthermore, the diffractive grating in the present embodiment is configured so that a pitch of the grating becomes narrower with increasing distance from the optical axis (from the central part toward the peripheral part). Therefore, the glass material has a combination of the materials and has a concave grating shape in the present embodiment to be able to obtain a positive power as a diffractive optical element.

It is preferred that the present embodiment be applied to the diffractive grating (the diffractive optical element) having a grating height higher than or equal to 1 μm. The diffractive grating having a grating height lower than 1 μm is for example a single-layer diffractive optical element that is provided at an interface of air. In this case, the phenomenon that the diffractive grating is hooked on the mold is a minor phenomenon, and the crack of the glass material is not so serious if the end portion of the diffractive grating of the glass material is widely open in an obtuse direction. On the contrary, when the diffractive grating has a grating height higher than or equal to 3 μm, the configuration of the present embodiment is especially effective since the grating crack is serious.

Embodiment 2

Figure 7:
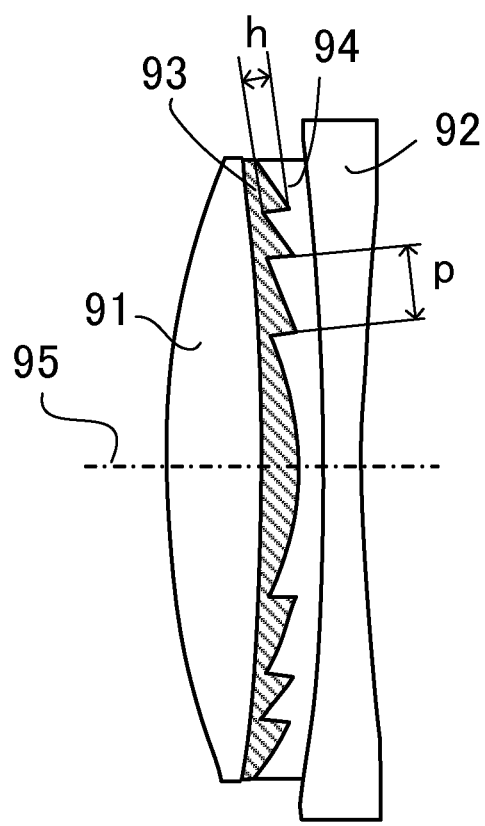
FIG. 7 is a cross-sectional diagram of a diffractive optical element in Embodiment 2.

Next, Embodiment 2 of the present invention will be described. FIG. 7 is a cross-sectional diagram of a diffractive optical element in the present embodiment. In FIG. 7, reference numeral 91 denotes a first lens, reference numeral 92 denotes a second lens (a first member), reference numeral 93 denotes a resin material (a second member), reference numeral 94 denotes a diffractive grating portion, and reference numeral 95 denotes an optical axis. The second lens 92 is made of a glass material having a low melting point, and is formed by a thermal press forming of the glass material. In the present embodiment, K-LaFK60 (SUMITA OPTICAL GLASS, Inc.) is used as the glass material. Furthermore, the resin material 93 is generated by using an ultraviolet curable resin C001 (DIC Corporation) as a base material and dispersing ITO nanoparticle of 14 vol % in the base material. FIG. 5 illustrates Abbe numbers and refractive indexes (physical properties) of the glass material and the resin material of the present embodiment. In FIG. 5, reference numeral 63 denotes a point (a physical property) of the resin material 93, and reference numeral 64 denotes a point (a physical property) of K-LaFK60.

Figure 8A:
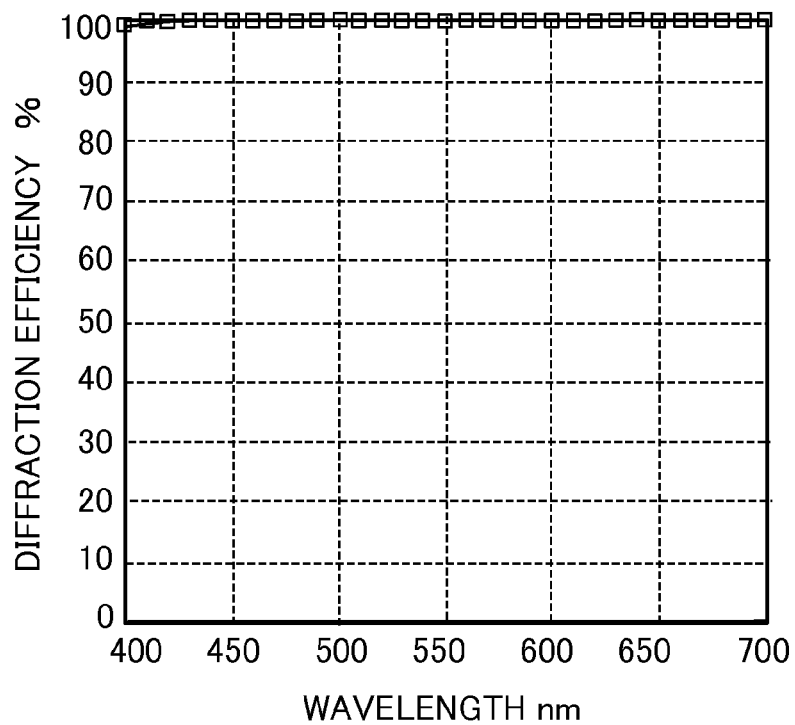
FIG. 8A is a graph illustrating a diffraction efficiency of the diffractive optical element for first-order light in Embodiment 2.
Figure 8B:
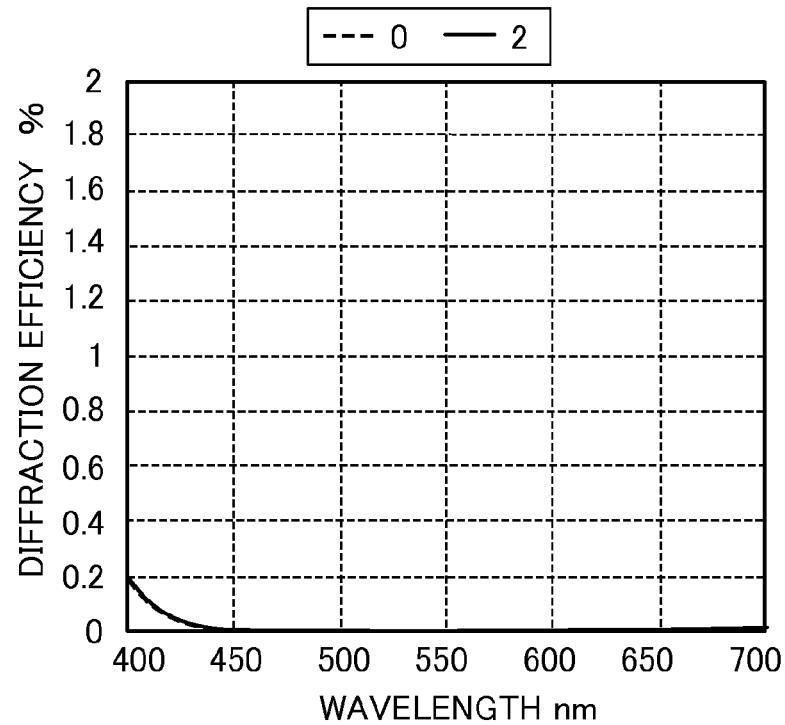
FIG. 8B is a graph illustrating a diffraction efficiency of the diffractive optical element for zeroth-order light and second-order light in Embodiment 2.

As illustrated in FIG. 7, the diffractive grating of the present embodiment is formed at an interface between the second lens 92 (the diffractive grating portion 94) made of the glass material and the resin material 93, and its grating height h is 9.6 μm. FIG. 8A is a graph illustrating diffraction efficiency for first-order light in the diffractive optical element of the present embodiment. As illustrated in FIG. 8A, according to the diffractive optical element of the present embodiment, high diffraction efficiency is maintained over a wide wavelength range. FIG. 8B is a graph illustrating diffraction efficiency for unnecessary light (zeroth-order light and second-order light) in the diffractive optical element of the present embodiment. As illustrated in FIG. 8B, since the diffraction efficiency of the unnecessary light indicates a low value, the generation of flare is suppressed.

The diffractive grating in the present embodiment is provided at an interface between the second lens 92 (the diffractive grating portion 94) made of the glass material having a high refractive index and low dispersion and the resin material 93 having a low refractive index and high dispersion. In other words, the diffractive grating is configured by combining the second lens 92 with the resin material 93 having a refractive index lower than and having dispersion higher than the second lens 92. As illustrated in FIG. 7, the shape of the diffractive grating changes so that the grating height h gets higher with increasing distance from the optical axis 95 (from the central part toward the peripheral part) in the diffractive grating portion 94 (the glass material) of the second lens 92. Therefore, when the shape of the diffractive grating is formed by the thermal press forming of the glass material, as described above, the separation of the mold and the glass material is easily performed, and the diffractive grating shape of the mold is appropriately transferred to the glass material.

In the diffractive optical element of the present embodiment, when a refractive index and Abbe number of the glass material for the d-line wavelength are denoted by ngd and vgd respectively, and a refractive index and Abbe number of the resin material for the d-line wavelength are denoted by nrd and vrd respectively, it is preferred that each material be selected so as to meet the following expressions.

$$nrd < ngd \quad (6)$$

$$vrd \leq 125 - 50nrd \quad (7)$$

$$nrd \leq 1.8 \quad (8)$$

$$vgd \geq 125 - 50ngd \quad (9)$$

$$ngd \geq 1.5 \quad (10)$$

As can be seen in FIG. 5, there are relatively many glass materials in this range. However, it is difficult for a resin solely to obtain a material that meets the refractive index and the Abbe number of the resin material, and therefore an organic or inorganic nanoparticle material having small Abbe number is dispersed to generate the resin material. Furthermore, since a pitch p of the diffractive grating gets narrower with increasing distance from the optical axis (from the central part toward the peripheral part) and the refractive index of the glass material is higher than the resin, the diffractive optical element of the present embodiment has a negative power. When the diffractive grating having the negative power as described in the present embodiment is used, options of the material increase because the refractive index of the glass material is higher than the refractive index of the resin material.

Figure 9:
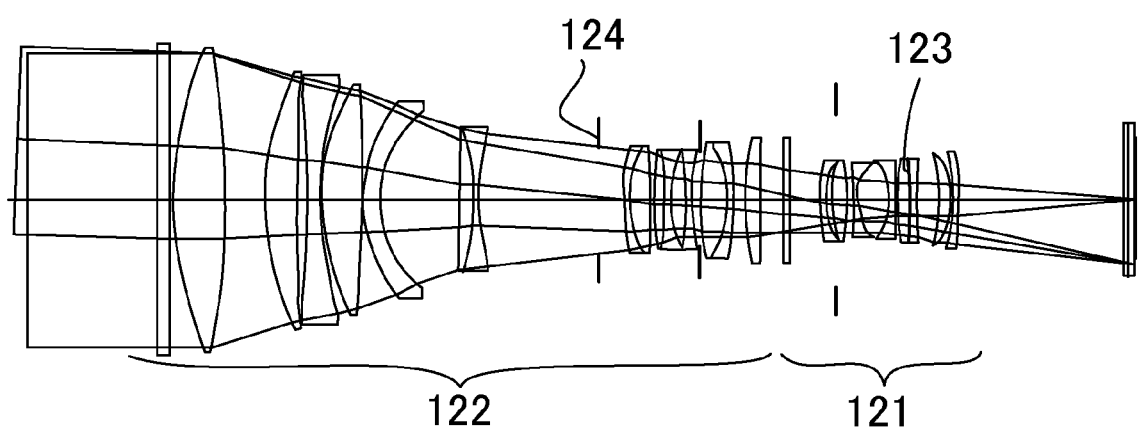
FIG. 9 is a diagram of describing an optical system in Embodiment 2.

FIG. 9 is a schematic configuration diagram of an image-pickup optical system to which the diffractive optical element in the present embodiment is applied. In FIG. 9, reference numeral 122 denotes a telephoto lens, reference numeral 124 denotes a stop, and reference numeral 121 denotes an extender. Reference numeral 123 denotes the diffractive optical element of the present embodiment, which has a negative power as a power of the diffractive grating. When the diffractive optical element 123 is disposed at a rear side (a right side in FIG. 9) compared with the stop 124 of the telephoto lens 122, the diffractive optical element having the negative power has a good balance when the chromatic aberration of magnification is corrected.

According to each embodiment described above, a diffractive optical element having high diffraction efficiency in a whole of a visible range can be manufactured at low cost. Therefore, a high-performance diffractive optical element can be provided at low cost.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-191656, filed on Aug. 30, 2010, which is hereby incorporated by reference herein in its entirety.

What is claimed is:
1. A diffractive optical element comprising:
a first member and a second member in contact with each other,
wherein the second member has a refractive index lower than a refractive index of the first member and has a dispersion higher than that of the first member, wherein the first member is made of a resin material and the second member is made of a glass material, wherein the second member includes a plurality of diffractive grating portions each having a grating wall surface and a grating surface that merge with each other, wherein each of the diffractive grating portions is configured so that a grating height thereof increases as a distance increases away from an optical axis, wherein the diffractive optical element has a positive power, and wherein the following expressions are met:

$ngd < nrd;$ $vgd \leq 125 - 50ngd;$ $ngd \geq 1.8;$ $vrd \geq 125 - 50nrd;$ and $nrd \geq 1.5,$ where ngd and vgd are a refractive index and an Abbe number of the glass material at a d-line wavelength respectively, and nrd and vrd are a refractive index and an Abbe number of the resin material at the d-line wavelength.

2. The diffractive optical element according to claim 1, wherein:

the diffractive grating is softened with heat using a thermal press, and a linear expansion coefficient of a material of a mold used in the thermal press forming is smaller than a linear expansion coefficient of the glass material.

3. The diffractive optical element according to claim 1, wherein the resin material is a material in which one of an organic nanoparticle material or an inorganic nanoparticle material, having a refractive index higher than a refractive index of a base material of a resin, is dispersed into the base material.

4. The diffractive optical element according to claim 1, wherein the glass material is a low-melting-point glass having a glass transition temperature of at most 550 degrees C.

5. The diffractive optical element according to claim 1, wherein the diffractive grating has a grating height of at least 3 μm.

6. An optical system comprising:

a stop; and a diffractive optical element comprising:

a first member and a second member in contact with each other, wherein the second member has a refractive index lower than a refractive index of the first member and has a dispersion higher than that of the first member, wherein the first member is made of a resin material and the second member is made of a glass material, wherein the second member includes a plurality of diffractive grating portions each having a grating wall surface and a grating surface that merge with each other, wherein each of the diffractive grating portions is configured so that a grating height thereof increases as a distance increases away from an optical axis, wherein the diffractive optical element has a positive power, and wherein the following expressions are met:

$ngd < nrd;$ $vgd \leq 125 - 50ngd;$ $ngd \leq 1.8;$ $v \geq rd125 - 50nrd;$ and $nrd \geq 1.5,$ where ngd and vgd are a refractive index and an Abbe number of the glass material at a d-line wavelength respectively, and nrd and vrd are a refractive index and an Abbe number of the resin material at the d-line wavelength.

* * * * *